(12) United States Patent
Jiang et al.

(10) Patent No.: US 9,296,936 B1
(45) Date of Patent: Mar. 29, 2016

(54) PREPARATION METHOD OF A WETTABILITY REVERSAL AGENT

(71) Applicant: China University of Petroleum (Beijing), Beijing-Changping District (CN)

(72) Inventors: Guancheng Jiang, Beijing (CN); Yang Xuan, Beijing (CN); Xi Wang, Beijing (CN); Shuo Zhang, Beijing (CN); Yuxiu An, Beijing (CN); Jinsheng Sun, Beijing (CN)

(73) Assignee: China University of Petroleum (Beijing) (CN)

( * ) Notice: Subject to any disclaimer, the term of this patent is extended or adjusted under 35 U.S.C. 154(b) by 0 days.

(21) Appl. No.: 14/861,903

(22) Filed: Sep. 22, 2015

(30) Foreign Application Priority Data

Feb. 11, 2015 (CN) .......................... 2015 1 0072893

(51) Int. Cl.
| | | |
|---|---|---|
| *C09K 8/03* | (2006.01) | |
| *C08F 220/08* | (2006.01) | |
| *C08F 220/06* | (2006.01) | |
| *C08F 214/18* | (2006.01) | |

(52) U.S. Cl.
CPC ................. *C09K 8/03* (2013.01); *C08F 214/18* (2013.01); *C08F 220/06* (2013.01); *C08F 220/08* (2013.01)

(58) Field of Classification Search
None
See application file for complete search history.

(56) References Cited

U.S. PATENT DOCUMENTS

| | | | | |
|---|---|---|---|---|
| 6,218,464 B1* | 4/2001 | Parker | ................... | C08F 220/22 428/522 |
| 2010/0197529 A1 | 8/2010 | Favero et al. | | |
| 2012/0065108 A1* | 3/2012 | Opstal | .................... | C08F 214/18 507/105 |
| 2013/0264061 A1* | 10/2013 | Baran, Jr. | .............. | C07C 303/40 166/308.2 |
| 2014/0171593 A1* | 6/2014 | Sasaki | ................. | C08F 293/005 525/276 |
| 2015/0299506 A1* | 10/2015 | Fan | ....................... | C08F 220/28 507/225 |

FOREIGN PATENT DOCUMENTS

| | | |
|---|---|---|
| CN | 102459501 A | 5/2012 |
| CN | 102887974 A | 1/2013 |
| CN | 103013478 A | 4/2013 |
| CN | 104327808 A | 2/2015 |

OTHER PUBLICATIONS

First Office Action from Chinese Patent Application No. 201510072893.5 dated Aug. 5, 2015.

* cited by examiner

*Primary Examiner* — Alicia Bland
(74) *Attorney, Agent, or Firm* — Calfee, Halter & Griswold LLP

(57) ABSTRACT

The present subject matter relates to a preparation method of a wettability reversal agent, comprising: (1) adding an emulsifier into water to prepare a mixed solution of emulsifier; (2) adding compounds represented by formula (1-a), (2-a), (3-a), (4-a), (5-a), and (6-a) to the mixed solution of emulsifier to obtain a pre-emulsion, adding an initiator, and initiating a polymerization reaction. When the wettability reversal agent and reservoir protecting agent composition disclosed in the present subject matter are used in a drilling fluid, they can effectively prevent the permeation of the water phase and oil phase in the drilling fluid into the reservoir, reduce the filter loss of the drilling fluid, and thereby effectively protect the reservoir against damages from the drilling fluid.

6 Claims, No Drawings

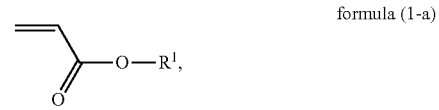
formula (1-a)

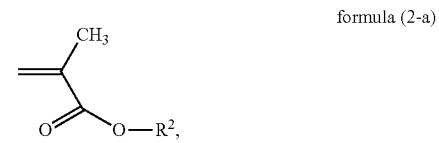

formula (2-a)

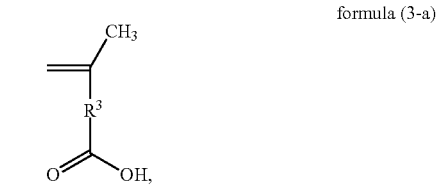

formula (3-a)

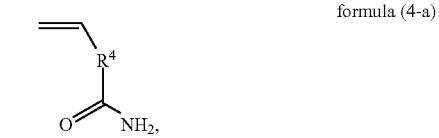

formula (4-a)

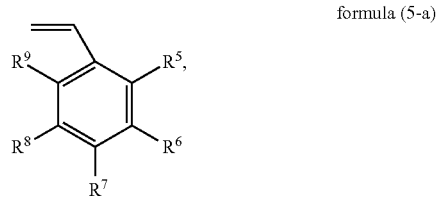

formula (5-a)

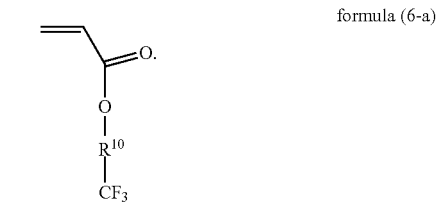

formula (6-a)

PREPARATION METHOD OF A WETTABILITY REVERSAL AGENT

CROSS REFERENCE TO RELATED APPLICATIONS

This application claims priority to Chinese Patent Application No. 201510072893.5 filed on Feb. 11, 2015 and entitled "Wettability Reversal Agent and Preparation Method Thereof, Reservoir Protecting agent Composition, Drilling Fluid for Low/Ultra-Low Permeability Reservoirs and Use Thereof", the entire content of which is fully incorporated hereby reference.

FIELD OF THE INVENTION

The present subject matter relates to a preparation method of a wettability reversal agent.

BACKGROUND OF THE INVENTION

Drilling fluids are reputed as the blood for bore wells. Good drilling fluid techniques are one of the important guarantees for safe, high-quality, efficient, and quick well drilling production. Drilling fluids are required in the development of oil fields. As the technology makes progresses in the petroleum industry, the exploration and development of low-permeability oil and gas resources has taken the first place among the five investment priorities in the development in the upstream of oil and gas industry in the world. Low-permeability oil and gas resources are very abundant and distributed widely in the world. A large quantity of low-permeability oil and gas fields have been found in major oil producing countries such as USA, Russia, and Canada, etc. The proved geological reserves of low-permeability oil and gas resources account for more than ⅓ of the proved geological reserves of oil and gas resources in China, and are widely distributed in the major oil fields. In consideration of energy safety in China, it is expected that a substantial part of new reserve and yield will be obtained from low-porosity and low-permeability oil and gas reserves.

The permeability of low-permeability reservoirs is 10~100 mD (milli Darcy); the permeability of ultra-low permeability reservoirs is lower than 10 mD. Compared with medium-permeability and high-permeability oil and gas reservoirs, it is much more difficult to explore and develop low-permeability oil and gas reservoirs. Low-porosity and low permeability reservoirs usually have characteristics such as thin pore throats, poor permeability, high clay mineral content, high capillary pressure, severe heterogeneity, and developed natural fractures, etc. Hence, reservoir protection is particularly important. To improve the effects and benefits of exploration and development of such reservoirs, it is particularly important to take effective reservoir protection measures.

Effective reservoir protection is an effective guarantee for improving the rate of oil and gas recovery, so that the skin factor can be an optimal negative value. If the drilling fluid is designed or used inappropriately in the well drilling process, the liquid and solid in the drilling fluid may intrude into the oil reservoir and have physical and chemical reactions with clay and other minerals in the oil and gas layer. Consequently, the permeability in the oil layer in the immediate vicinity of the well may be decreased severely, and the resistance against air and gas flow towards the bottom of the well may be increased, resulting in reduced oil yield. The injuries to the reservoir have critical impacts on low-permeability reservoirs.

The optimization of drilling fluid system and formulation is one of the important considerations in reservoir protection in the drilling process. Effective control of rheological property and filter loss property of the drilling fluid, high compatibility with the reservoir, design of temporary plugging scheme, and formation of dense filter mass that can be removed easily are key factors in the optimization and design of a reservoir protective drilling fluid. In addition, developing novel, easy-to-operate, and effective reservoir protective techniques is a new task in the reservoir protective drilling fluid field.

Low/ultra-low permeability reservoirs usually have characteristics such as high argillaceous cement content and high capillary pressure, thin pore throats, complex structure, severe heterogeneity, and high oil and gas flow resistance, etc., and may easily have damages such as water sensitivity and water blocking, etc. resulted from intrusion of foreign fluids in the drilling process. The damage ratio is as high as 70%~90%. It is proven in field tests that the above problem can't be solved by conventional drilling fluid systems. Hence, it is especially important to develop new drilling fluid additives and reservoir protective drilling fluid techniques to meet the current challenge of complex geological conditions. Up to now, though long-time researches on reservoir protective drilling fluid techniques have been made in worldwide, and techniques such as shielded temporary plugging technique, fractal geometry-based temporary plugging technique, $D_{90}$ ideal temporary plugging technique, broad-spectrum temporary plugging technique, alkali soluble micrometer-level cellulose temporary plugging technique, $D_{50}$ temporary plugging technique, filming technique, oil film technique, etc., have been developed, the protective effect of these techniques is not ideal for complex reservoirs such as low/ultra-low permeability reservoirs. These techniques have to be improved further. The root cause is that these techniques don't take consideration of the reservoir damages such as water blocking and water sensitivity incurred by spurt loss, and the plugging effect of these techniques should be further improved under some conditions.

In addition, for water blocking damage in low-permeability gas reservoirs, though an ideal of adding surface active agents into drilling fluids to relieve water blocking damage has been put forward and applied in the Qiudong Low-Permeability Gas Reservoir, which provides a new way for improving the drilling fluid and completion fluid techniques for protection of low/ultra-low permeability reservoirs, further improvements must be made in selection of surface active agent or establishment of protection. The existing drilling fluids have properties that can essentially meet the requirement for cuttings carrying and well wall stability, but don't provide an ideal reservoir protection effect, and the core permeability recovery value of the reservoir is low. Though temporary plugging agents are added in these drilling fluids, the plugging performance is not high because the structural characteristics of low/ultra-low permeability reservoirs are not taken into consideration fully. Consequently, the filtrate may intrude into the reservoir and thereby results in damages such as water sensitivity and water blocking, etc.

SUMMARY OF THE INVENTION

The present application discloses a preparation method of a wettability reversal agent.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

To overcome the drawbacks in above mentioned drilling fluids for low/ultra-low permeability reservoirs in the prior art, the present subject matter provides a preparation method of a wettability reversal agent that is especially suitable for low/ultra-low permeability reservoirs and has outstanding reservoir protection performance.

To attain the objects described above, the present subject matter further provides a preparation method of a wettability reversal agent, comprising:
(1) adding an emulsifier into water to prepare a mixed solution of emulsifier;
(2) adding compounds represented by formula (1-a), (2-a), (3-a), (4-a), (5-a), and (6-a) to the mixed solution of emulsifier to obtain a pre-emulsion, adding an initiator, and initiating a polymerization reaction;

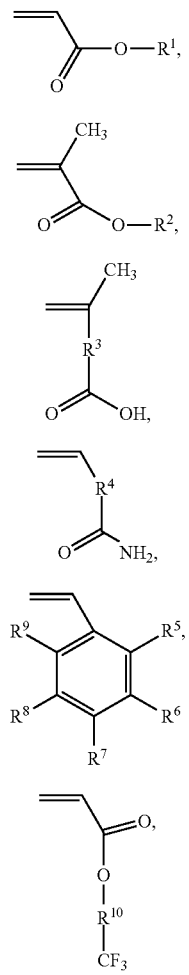

wherein, $R^1$ is $C_1$-$C_6$ alkyl; $R^2$ is $C_1$-$C_6$ alkyl; $R^3$ and $R^4$ independently are $C_0$-$C_6$ alkyl; $R^5$, $R^6$, $R^7$, $R^8$ and $R^9$ independently are $C_1$-$C_6$ alkyl or H; $R^{10}$ is $C_0$-$C_6$ alkyl; the molar ratio among the compounds represented by formula (1-a), (2-a), (3-a), (4-a), (5-a), and (6-a) is 1:0.9-1.5:0.09-0.5:0.2-0.5:0.05-0.3:0.3-0.8; and the conditions of the polymerization reaction ensures that the weight-average molecular weight of the obtained wettability reversal agent is 5,000-7,000 g/mol; wherein, the weight ratio of emulsifier to water in the mixed solution of emulsifier obtained in step (1) is 0.7-2:100.

When the wettability reversal agent and reservoir protecting agent composition disclosed in the present subject matter are used in a drilling fluid, they can effectively prevent the permeation of the water phase and oil phase in the drilling fluid into the reservoir, reduce the filter loss of the drilling fluid, and thereby effectively protect the reservoir against damages from the drilling fluid.

Other aspects and advantages of the present subject matter will be further detailed in the embodiments hereunder.

The present subject matter provides a wettability reversal agent, comprising structural units denoted by formula (1), (2), (3), (4), (5), and (6):

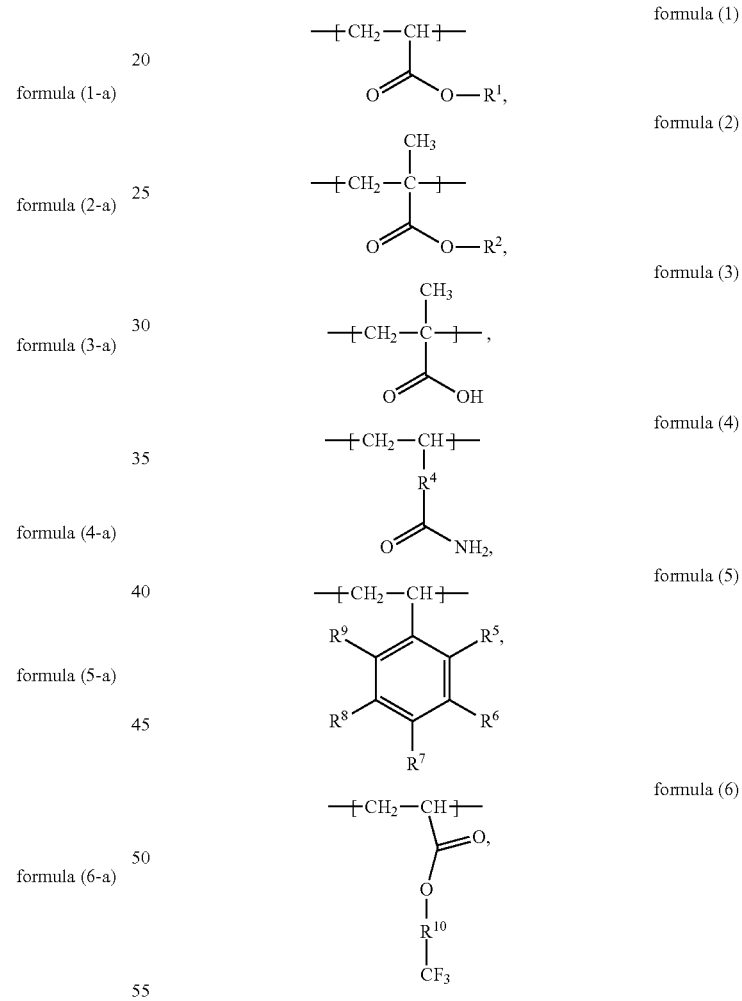

wherein, $R^1$ is $C_1$-$C_6$ alkyl; $R^2$ is $C_1$-$C_6$ alkyl; $R^3$ and $R^4$ independently are $C_0$-$C_6$ alkyl; $R^5$, $R^6$, $R^7$, $R^8$ and $R^9$ independently are $C_1$-$C_6$ alkyl or H; $R^{10}$ is $C_0$-$C_6$ alkyl; the molar ratio among the structural units denoted by formula (1), (2), (3), (4), (5), and (6) is 1:0.9-1.5:0.09-0.5:0.2-0.5:0.05-0.3:0.3-0.8; and the weight-average molecular weight of the wettability reversal agent is 5,000-7,000 g/mol.

According to the present subject matter, the wettability reversal agent not only has ultra-low interfacial tension and thereby can avoid the water blocking damage in ultra-low permeability reservoirs, but also can effectively modify surface properties. Specifically, the wettability reversal agent can reverse a solid surface from lipophilicity/hydrophilicity to hydrophobicity and lipophobicity (also referred to as "gas wettability"), so as to prevent intrusion of the water phase and oil phase in the drilling fluid into the reservoir, reduce oil-water interfacial tension, inhibit capillarity in reservoir rock, reduce hydrated expansion, and prevent direct contact between reservoir rock surface and foreign fluids, etc., and thereby effectively reduce the damages of liquid loss in the drilling fluid to low/ultra-low permeability reservoirs.

In another embodiment, $R^1$ is $C_2$-$C_5$ alkyl, and more preferably is ethyl, propyl, butyl or amyl.

In another embodiment, $R^2$ is $C_1$-$C_4$ alkyl, and more preferably is methyl, ethyl, propyl, or butyl.

In another embodiment, $R^3$ and $R^4$ independently are $C_0$-$C_4$ alkyl, and more preferably are $C_0$, methyl, ethyl, propyl or butyl.

In another embodiment, $R^5$, $R^6$, $R^7$, $R^8$ and $R^9$ independently are $C_1$-$C_4$ alkyl or H, and more preferably are H, methyl or ethyl.

In another embodiment, $R^{10}$ is $C_0$-$C_4$ alkyl, and more preferably are $C_0$, methyl, ethyl, propyl or butyl.

Wherein, $C_0$ alkyl means that the group doesn't exist and the groups at the two ends are directly connected.

In another embodiment of the present subject matter, in the structural units of the wettability reversal agent, $R^1$ is butyl, $R^2$ is methyl, $R^3$ is $C_0$ alkyl (doesn't exist), $R^4$ is $C_0$ alkyl (doesn't exist), $R^5$, $R^6$, $R^7$, $R^8$, and $R^9$ are H, and $R^{10}$ is methyl.

In another embodiment of the present subject matter, in the structural units of the wettability reversal agent, $R^1$ is propyl, $R^2$ is butyl, $R^3$ is ethyl, $R^4$ is butyl, $R^5$, $R^6$, $R^8$ and $R^9$ are H, $R^7$ is methyl, and $R^{10}$ is methyl.

According to the present subject matter, to obtain a wettability reversal agent with better wettability reversal performance, preferably, the weight-average molecular weight of the wettability reversal agent is 5,400-6,000 g/mol.

In another embodiment, the molecular weight distribution coefficient Mw/Mn of the wettability reversal agent is 1.1-1.3.

According to the present subject matter, to obtain a wettability reversal agent that can work with the reservoir protecting agent to improve the fluid loss property of the drilling fluid and match the structural characteristics of low/ultra-low permeability reservoirs, preferably, the wettability reversal agent employs the structural units denoted by formula (1), (2), (3), (4), (5) and (6) at 1:0.9-1:0.09-0.3:0.3-0.4:0.07-0.4:0.4-0.6 molar ratio.

The present subject matter further provides a preparation method of a wettability reversal agent, comprising:
(1) adding an emulsifier into water to prepare a mixed solution of emulsifier;
(2) adding compounds represented by formula (1-a), (2-a), (3-a), (4-a), (5-a), and (6-a) to the mixed solution of emulsifier to obtain a pre-emulsion, adding an initiator, and initiating a polymerization reaction;

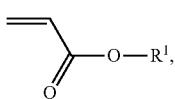
formula (1-a)

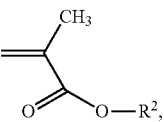
formula (2-a)

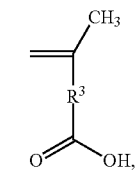
formula (3-a)

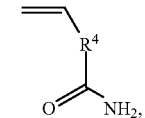
formula (4-a)

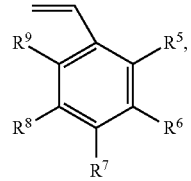
formula (5-a)

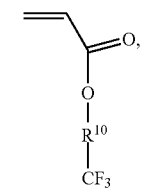
formula (6-a)

wherein, $R^1$ is $C_1$-$C_6$ alkyl; $R^2$ is $C_1$-$C_6$ alkyl; $R^3$ and $R^4$ independently are $C_0$-$C_6$ alkyl; $R^5$, $R^6$, $R^7$, $R^8$ and $R^9$ independently are $C_1$-$C_6$ alkyl or H; $R^{10}$ is $C_0$-$C_6$ alkyl; the molar ratio among the compounds represented by formula (1-a), (2-a), (3-a), (4-a), (5-a), and (6-a) is 1:0.9-1.5:0.09-0.5:0.2-0.5:0.05-0.3:0.3-0.8; and conditions of the polymerization reaction ensures that the weight-average molecular weight of the obtained wettability reversal agent is 5,000-7,000 g/mol.

According to the present subject matter, the structural units of the wettability reversal agent depend on the compounds with the structures denoted by formula (1-a), (2-a), (3-a), (4-a), (5-a) and (6-a), which can be selected according to the structure of the wettability reversal agent to be prepared. Hence, the groups $R^1$, $R^2$, $R^3$, $R^4$, $R^5$, $R^6$, $R^7$, $R^8$, $R^9$ and $R^{10}$ in the compound with the structures denoted by formula (1-a), (2-a), (3-a), (4-a), (5-a) and (6-a) preferably are within the scopes described above.

In another embodiment, the chemical compound represented by formula (1-a) is one or more of ethyl acrylate, propyl acrylate, butyl acrylate, and amyl acrylate.

In another embodiment, the chemical compound represented by formula (2-a) is one or more of methyl methacrylate (MMA), ethyl methacrylate, propyl methacrylate, and butyl methacrylate.

In another embodiment, the compound represented by formula (3-a) is methacrylic acid and/or 3-methyl-3-butenoic acid.

In another embodiment, the chemical compound represented by formula (4-a) is one or more of acrylamide, butenylamide, and heptenylamide.

In another embodiment, the compound represented by formula (5-a) is styrene and/or p-methyl styrene.

In another embodiment, the compound represented by formula (6-a) is ethyl trifluoroacrylate (i.e., in the case that $R^{10}$ is methyl).

In another embodiment, the molar ratio among the structural units denoted by formula (1-a), (2-a), (3-a), (4-a), (5-a), and (6-a) is 1:0.9-1:0.09-0.3:0.3-0.4:0.07-0.4:0.4-0.6.

The polymerization reaction among the compounds with the structures denoted by formula (1-a), (2-a), (3-a), (4-a), (5-a) and (6-a) is an emulsion polymerization reaction actually. Hence, an emulsifier is required in the polymerization reaction. In another embodiment, in the method for preparation of the wettability reversal agent according to the present subject matter, a mixed water solution of emulsifier must be prepared first (e.g., mix an emulsifier in water and stir, for example, stir for 20-40 min. at 400-500 r/min. stirring speed), i.e., step (1), before the step (2) can be executed.

According to the present subject matter, there is no particular restriction on the emulsifier, as long as a mixture of compounds with the structures denoted by formula (1-a), (2-a), (3-a), (4-a), (5-a) and (6-a) can be emulsified and polymerized to obtain the wettability reversal agent. For example, the emulsifier can be one or more of sodium decyl sulfate, sodium dodecyl sulfate, and sodium dodecyl benzene sulfonate.

In another embodiment, in the mixed solution of emulsifier prepared in step (1), the weight ratio of emulsifier to water is 0.7-2:100.

Wherein, In another embodiment, alkali carbonate and/or hydrocarbonate, such as one or more of sodium carbonate, potassium carbonate, sodium bicarbonate, and potassium bicarbonate, etc., are/is added into the mixed solution of emulsifier in step (1). In another embodiment, the weight ratio of alkali carbonate and/or hydrocarbonate to water is 0.5-1.5:100.

After the mixed solution of emulsifier is prepared in step (1), the mixed solution of emulsifier prepared in step (1) is subjected to contact with the compounds with the structures denoted by formula (1-a), (2-a), (3-a), (4-a), (5-a) and (6-a), to prepare a pre-emulsion. Wherein, the contacting process can be: add a mixture of the compounds represented by formula (1-a), (2-a), (3-a), (4-a) (which can be dissolved into distilled water to obtain a solution of 1-3 g/mL), (5-a) and (6-a) in droplets into the mixed solution of emulsifier, and then carry out emulsification by means of shearing to obtain the pre-emulsion (e.g., carry out emulsification by shearing with a shear emulsifying machine).

According to the present subject matter, in another embodiment, in step (2), based on the total weight of the compounds represented by formula (1-a), (2-a), (3-a), (4-a), (5-a) and (6-a), the concentration of the emulsifier is 2.5-4 wt. %. When the polymerization reaction in step (2) is carried out at such a weight ratio, a wettability reversal agent that can form a hydrophobic and oleophobic protective layer on the rock more easily can be obtained.

According to the present subject matter, the concentration of the initiator can vary in a wide range, as long as the wettability reversal agent according to the present subject matter can be obtained. In another embodiment, based on the total weight of the compounds with the structures denoted by formula (1-a), (2-a), (3-a), (4-a), (5-a) and (6-a), the concentration of the initiator is 0.3-0.6 wt. %. In another embodiment, the initiator is one or more of ammonium persulfate (APS), hydrogen peroxide, and potassium persulfate.

In view of the high activity of the initiator, the polymerization reaction in the present subject matter preferably happens under the shielding of an inactive gas, wherein, the inactive gas refers to a gas that does not participate in the polymerization reaction, such as nitrogen, helium, or neon, etc.

According to the present subject matter, in another embodiment, an inactive gas (e.g., nitrogen) is fed while the solution is stirred at a high speed (e.g., 300-400 rpm).

Likewise, to control the reaction rate of the polymerization reaction, in the present subject matter, preferably, the initiator is added in two steps: ⅓-½ of the initiator can be added after the pre-emulsion is heated up to 60-70° C., and the pre-emulsion is stirred at a low speed (e.g., 180-250 r/min.); the remaining initiator can be added after the pre-emulsion is heated up to 65-80° C.; then, the pre-emulsion can be heated up to 75-85° C. and held at that temperature for reaction for 2.5-4 h. Such a stepwise initiator adding approach is advantageous for improving the yield and quality of the product. Wherein, the heating rate of the pre-emulsion can be controlled at 0.2-2° C./min, preferably 0.5-1° C./min.

The conditions of polymerization reaction mentioned in the present subject matter refer to reaction for 2.5-4 h at 75-85° C.

According to the present subject matter, to adapt to the drilling fluid, the process further comprises a step of cooling and neutralization of the reaction system after the polymerization reaction is completed. For example, when the reaction system is cooled down to 60° C. or a lower temperature, alkali carbonate and/or hydrocarbonate can be added into the reaction system to adjust the pH of the reaction system to a neutral value, so as to obtain an emulsion that contains the wettability reversal agent disclosed in the present subject matter. Then, the emulsion can be directly added into a drilling fluid. Or, the emulsion can be evaporated at 35-50° C. to obtain a solid product of the wettability reversal agent disclosed in the present subject matter.

The present subject matter further provides a wettability reversal agent prepared with the above-mentioned preparation method.

The present subject matter further provides a reservoir protecting agent composition, which contains the above-mentioned wettability reversal agent and a reservoir protecting agent.

With consideration of the structural characteristics of low/ultra-low permeability reservoirs, the inventor has developed a wettability reversal agent. However, to further improve the protection of low/ultra-low permeability reservoirs, the inventor has found: when such a wettability reversal agent is used in combination with one or more reservoir protecting agents, a better protective result can be attained. Particularly, when the weight ratio of the wettability reversal agent to the reservoir protecting agent is 100:200-300, the wettability reversal agent and the reservoir protecting agent can work with each other in a better way to achieve reservoir protection.

Especially, the inventor has found: if the protecting agent is composed of the structural units denoted by formula (7), (8) and (9), the protecting agent can work with the wettability reversal agent optimally to achieve protection of low/ultra-low permeability reservoirs, wherein:

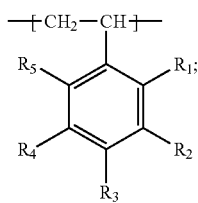

formula (7)

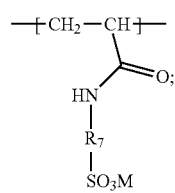

formula (8)

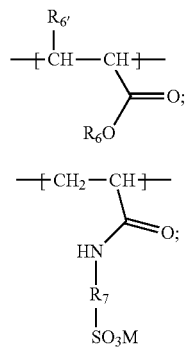

formula (9)

wherein, $R_1$, $R_2$, $R_3$, $R_4$, and $R_5$ independently are H, $C_1$-$C_4$ alkyl or $C_1$-$C_4$ alkoxyl; $R_6$ is $C_1$-$C_6$ alkyl; $R_{6'}$ is H or $C_1$-$C_4$ alkyl; $R_7$ is $C_1$-$C_{10}$ alkyl; M is H or an alkali metal element; the molar ratio of the structural units denoted by formula (7):the structural units denoted by formula (8):the structural units denoted by formula (9) is 1:0.5-2:0.2-1; the weight-average molecular weight of the protecting agent is 53,000-60,000 g/mol.

The protecting agent is an amphiphilic polymer, which contains hydrophilic sulfonate groups and a large quantity of benzene rings and hydrophobic acrylate groups. When the above-mentioned amphiphilic polymer serving as a protecting agent is used with the wettability reversal agent in combination in a drilling fluid, they can complement each other on the surface of reservoir and provide better protection for the reservoir. Wherein, the strongly hydrophilic sulfonate groups in the protecting agent will attach to the surface of the clay, so that the hydrated film on the surface of the clay is thickened, and thereby the diffused electric doublet layer on the surface of the clay is enhanced, and flocculation or agglomeration of the clay incurred by high temperature and high-salinity electrolytes can be effectively prevented. Hence, the protecting agent can endow the drilling fluid with outstanding temperature tolerance, salinity resistance, and filter loss reduction properties. In addition, the hydrophilic sulfonate groups can attach to the surface of reservoir rock and overlying clay shale, while the hydrophobic groups extend outward from the rock surface; thus, a hydrophobic film can be formed on the rock surface. The hydrophobicity can inhibit the permeation of free water in the drilling fluid into the reservoir rock and clay shale. Thus, on one hand, the reservoir is protected against the damages from the drilling fluid; on the other hand, the hydrated expansion and dispersion of the clay shale can be inhibited.

According to the present subject matter, to obtain a polymer serving as a protecting agent for drilling fluid with higher performance, preferably, in the structural units denoted by formula (7), (8), and (9), which constitute the protecting agent, $R_1$, $R_2$, $R_3$, $R_4$, and $R_5$ independently are H, $C_1$-$C_3$ alkyl or $C_1$-$C_3$ alkoxyl and more preferably, $R_1$, $R_2$, $R_3$, $R_4$, and $R_5$ independently are H, methyl, ethyl, methoxyl or ethyoxyl; further more preferably, $R_1$, $R_2$, $R_3$, $R_4$, and $R_5$ independently are H, methyl or ethyl.

According to the present subject matter, $R_6$ preferably is $C_1$-$C_4$ alkyl, and more preferably is methyl, ethyl, n-propyl, iso-propyl, n-butyl, iso-butyl or tert-butyl.

According to the present subject matter, $R_{6'}$ preferably is H, methyl or ethyl, and more preferably is H or methyl.

According to the present subject matter, $R_7$ preferably is $C_2$-$C_{10}$ alkyl, more preferably is $C_2$-$C_8$ alkyl, further more preferably is $C_2$-$C_7$ alkyl, still further more preferably is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$— or —$CH_2$—$CHCH_3$—$CH_2$—, and particularly preferably is —$C(CH_3)_2$—$CH_2$—.

According to the present subject matter, M preferably is H, Na, K or Li, and more preferably is H or Na.

In another embodiment of the present subject matter, in the structural units denoted by formula (7), (8), and (9), which constitute the amphiphilic polymer, $R_1$, $R_2$, $R_3$, $R_4$, and $R_5$ are H, $R_6$ is n-butyl, $R_{6'}$ is H, and $R_7$ is —$C(CH_3)_2$—$CH_2$—.

In another embodiment of the present subject matter, in the structural units denoted by formula (7), (8), and (9), which constitute the amphiphilic polymer, $R_1$, $R_2$, $R_4$, and $R_5$ are H, $R_3$ is methyl, $R_6$ is ethyl, $R_{6'}$ is methyl, and $R_7$ is —$C(CH_3)_2$—$CH_2$—.

In another embodiment of the present subject matter, in the structural units denoted by formula (7), (8), and (9), which constitute the amphiphilic polymer, $R_1$, $R_2$, $R_4$, and $R_5$ are H, $R_3$ is methyl, $R_6$ is ethyl, $R_{6'}$ is H, and $R_7$ is —$C(CH_3)_2$—$CH_2$—.

In another embodiment, the weight-average molecular weight of the protecting agent is 55,000-60,000 g/mol.

In another embodiment, the molecular weight distribution coefficient Mw/Mn of the protecting agent is 1.1-1.5, preferably 1.2-1.4.

According to the present subject matter, to balance the effect of the hydrophobic end and the effect of the hydrophilic end in the amphiphilic polymer and enhance the cooperation between the protecting agent and the wettability reversal agent to attain the objective of reservoir protection, preferably, in the protecting agent, the molar ratio of the structural units denoted by formula (7):the structural units denoted by formula (8):the structural units denoted by formula (9) is 1:0.5-1.6:0.3-0.6.

According to the present subject matter, the protecting agent can be prepared through any conventional polymerization reaction, as long as the obtained protecting agent has the structure and composition characteristics required in the present subject matter. In another embodiment, the method for preparation of the protecting agent in the present subject matter comprises: in the existence of a second initiator, controlling a chemical compound represented by formula (7-a), a chemical compound represented by the formula (8-a), and a chemical compound represented by formula (9-a) to contact with a second emulsifier in water to obtain an emulsified mixture and have a second polymerization reaction, at a molar ratio of the chemical compound represented by formula (7-a): the chemical compound represented by the formula (8-a):the chemical compound represented by formula (9-a) equal to 1:0.5-2:0.2-1, under appropriate conditions that ensure the weight-average molecular weight of the obtained polymer is 53,000-60,000 g/mol;

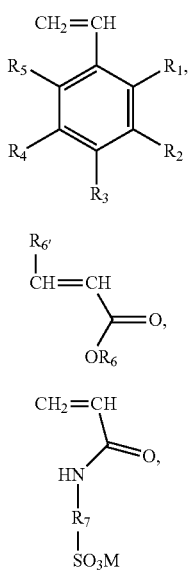

formula (7-a)

formula (8-a)

formula (9-a)

wherein, $R_1$, $R_2$, $R_3$, $R_4$, and $R_5$ independently are H, $C_1$-$C_4$ alkyl or $C_1$-$C_4$ alkoxyl; $R_6$ is $C_1$-$C_6$ alkyl; $R_{6'}$ is H or $C_1$-$C_4$ alkyl; $R_7$ is $C_1$-$C_{10}$ alkyl; M is H or an alkali metal element.

Wherein, the structural units of the protecting agent depend on the chemical compound represented by formula (7-a), the chemical compound represented by formula (8-a), and the chemical compound represented by formula (9-a); the chemical compound represented by formula (7-a), the chemical compound represented by formula (8-a), and the chemical compound represented by formula (9-a) can be selected according to the desired structure of the protecting agent. Thus, the $R_1$, $R_2$, $R_3$, $R_4$, $R_5$, $R_6$, $R_{6'}$, $R_7$ and M are preferably within the scopes described above.

In another embodiment, the chemical compound represented by formula (7-a) is one or more of styrene, p-methyl styrene, and p-ethyl styrene.

In another embodiment, the chemical compound represented by formula (8-a) is one or more of methyl acrylate, ethyl acrylate, butyl acrylate, butyl methacrylate, and propyl methacrylate.

In another embodiment, the chemical compound represented by formula (9-a) is one or more of 2-acrylamide-2-methyl propanesulfonic acid and 2-acrylamide propanesulfonic acid.

In another embodiment, the molar ratio of the chemical compound represented by formula (7-a):the chemical compound represented by formula (8-a):the chemical compound represented by formula (9-a) is 1:0.5-1.6:0.3-0.6; further in another embodiment, the molar ratio is 1:0.6-1.6:0.3-0.5.

The polymerization reaction among the chemical compound represented by formula (7-a), the chemical compound represented by formula (8-a), and the chemical compound represented by formula (9-a) is an emulsion polymerization reaction actually. Hence, an emulsifier must be added in the polymerization reaction. To enable the above monomers to have a reaction among them more uniformly and more completely, in the present subject matter, preferably the chemical compound represented by formula (7-a), the chemical compound represented by formula (8-a), and the chemical compound represented by formula (9-a) are mixed with water to form a mixture, and then an emulsifier is added into the mixture to obtain an emulsified mixture.

Wherein, based on the total weight of the emulsified mixture, the total content amount of the chemical compound represented by formula (7-a), the chemical compound represented by formula (8-a), and the chemical compound represented by formula (9-a) preferably is 40-50 wt. %. In another embodiment, the content amount of the chemical compound represented by formula (7-a) is 10-18 wt. %. In another embodiment, the content amount of the chemical compound represented by formula (8-a) is 12-25 wt. %. In another embodiment, the content amount of the chemical compound represented by formula (9-a) is 8-18 wt. %.

There is no particular restriction on the emulsifier in the present subject matter, as long as the emulsifier enables the compound represented by formula (7-a), the compound represented by formula (8-a), and the compound represented by formula (9-a) to have emulsion polymerization with the method disclosed in the present subject matter and the protecting agent disclosed in the present subject matter can be obtained. In another embodiment, based on the total weight of the compound represented by formula (7-a), the compound represented by formula (8-a), and the compound represented by formula (9-a), the concentration of the second emulsifier is 2-4 wt. %. In another embodiment, the second emulsifier is one or more of sodium dodecyl benzene sulfonate, sodium dodecyl sulfate, and sodium diisopropyl naphthalene sulfonate.

The concentration of the second initiator can vary in a wide range, as long as the protecting agent according to the present subject matter can be obtained. In another embodiment, based on the total weight of the chemical compound represented by formula (7-a), the chemical compound represented by formula (8-a), and the chemical compound represented by formula (9-a), the concentration of the second initiator is 0.2-0.4 wt. %. In another embodiment, the second initiator is one or more of potassium persulfate, ammonium persulfate, benzoyl peroxide, and hydrogen peroxide.

In view of the high activity of the initiator, in the present subject matter, an inactive gas can be fed into the reaction system to expel oxygen in the reaction system and thereby keep the second polymerization reaction in inert atmosphere before the second polymerization reaction, wherein, the inactive gas is a gas that will not participate in the second polymerization reaction and can expel oxygen, such as nitrogen, helium, or neon, etc. The inactive gas can be fed for 25-40 min., for example.

Likewise, to control the reaction rate of the second polymerization reaction, preferably the emulsified mixture is heated up to 60-70° C. before the inactive gas is fed; then, the second initiator can be added, and the second polymerization reaction can be started.

According to the present subject matter, in another embodiment, the conditions of the second polymerization reaction include: temperature is 70-85° C., time is 3-4 h. Through a polymerization reaction under such conditions, a protecting agent that is especially suitable for the composition in the present subject matter can be obtained.

The protecting agent according to the present subject matter can be obtained after the second polymerization reaction. To extract the protecting agent, the resultant mixed solution can be cooled after the second polymerization reaction is completed, and the pH of the resultant mixed solution can be adjusted to 8.5-10 with 20-30 wt. % of water solution of an alkali metal hydroxide (e.g., water solution of sodium hydroxide, or water solution of potassium hydroxide, etc.) to obtain a precipitate; then, the precipitate can be separated from the mixed solution and dried at 95-105° C., so as to obtain a solid protecting agent, which can be used as the protecting agent for drilling fluid in the present subject matter.

For low/ultra-low permeability reservoirs, which have characteristics such as small reservoir pores, thin pore throats, and low permeability, damages such as water blocking and water sensitivity, etc. usually occur at different degrees after a drilling fluid is applied, and it is difficult to recover from such damages once they occur. In view of above problems, the inventor provides the wettability reversal agent. On rock surfaces treated with the wettability reversal agent, the liquid wetting angle can be increased to 90° or above, so that the original lipophilicity and hydrophilicity are reversed to hydrophobicity and lipophobicity. Thus, when the wettability reversal agent is used in a drilling fluid for well drilling in a low/ultra-low permeability reservoir, not only the intrusion of the drilling fluid into the reservoir in the drilling process can be prevented, but also the water blocking damage can be prevented owing to the reversal of wetting property of the rock surface; hence, the direct contact between the reservoir rock surface and foreign fluids can be prevented, and reservoir damages can be avoided. The wettability reversal agent according to the present subject matter can significantly reduce oil water interfacial tension, inhibit capillarity in the reservoir rock, have high temperature tolerance and high chemical stability, and can effectively alleviate the water blocking effect. The protecting agent described above will concentrate into colloidal particles when it reaches certain concentration; thus, under the temperature and pressure conditions at the bottom of well, the protecting agent can attach, deform, and accumulate on the rock surface to form a dense film, and thereby prevent intrusion of the liquid phase and solid phase in the drilling fluid into the strata. The protecting agent can concentrate into colloidal particles and disperse in the drilling fluid system; then, the colloidal particles deform on the surface of well wall rock and form a film, which can attain a stratum plugging effect. Hence, the inventor uses the wettability reversal agent and the protecting agent in combination, to effectively achieve plugging of a low/ultra-low permeability reservoir and prevent water blocking and water sensitivity, etc.; thus, the reservoir is protected effectively.

To that end, the present subject matter provides a drilling fluid that contains the protecting agent composition for low/ultra-low permeability reservoirs.

To give a better play of the effect of the protecting agent composition in a drilling fluid, in another embodiment, the content amount of the protecting agent composition is 2.5-3 wt. %. Wherein, the content amount of the wettability reversal agent can be 0.6-1.5 wt. % (the wettability reversal agent must be compatible with the reservoir rock and the fluid phase, and can effectively reduce the surface tension of the fluid phase; the concentration of the wettability reversal agent should not be too high). The content amount of the protecting agent can be 1.2-2.3 wt. %.

There is no particular restriction on the drilling fluid system that contains the protecting agent composition in the present subject matter. In other words, the drilling fluid system can be any conventional drilling fluid system in the art, as long as the protecting agent composition according to the present subject matter is added into the conventional drilling fluid system. As such a conventional drilling fluid system, for example, the drilling fluid can be one or more of potassium chloride-poly alcohol drilling fluid, organosilicon drilling fluid, and cationic drilling fluid. The potassium chloride-poly alcohol drilling fluid can be any potassium chloride-poly alcohol drilling fluid well known to those skilled in the art; for example, it can be one or more of potassium chloride-polyethylene glycol drilling fluid, potassium chloride-polypropylene glycol drilling fluid, potassium chloride-ethylene glycol/propylene glycol copolymer drilling fluid, potassium chloride-polyglycerol drilling fluid and potassium chloride-polyvinyl glycol drilling fluid. The organosilicon drilling fluid can be any organosilicon drilling fluid well known to those skilled in the art, and the organosilicon in the organosilicon drilling fluid can be selected from one or more of sodium methylsiliconate, potassium methylsiliconate, and silicone-potassium humate. The cationic drilling fluid can be any cationic drilling fluid well known to those skilled in the art; for example, the cations in the cationic drilling fluid can be selected from one or more of 2,3-epoxypropyl trimethyl ammonium chloride, 3-chloro-2-hydroxypropyl trimethyl ammonium chloride, and cationic polyacrylamide.

In another embodiment, the drilling fluid according to the present subject matter further contains one or more of bentonite, sodium carbonate, alkali metal hydroxide, filtrate reducer, temperature-tolerant filtrate reducer, anti-foaming agent, anti-collapse agent, well wall stabilizer, tackifier, and lubricant.

Wherein, the bentonite refers to clay which contains montmorillonite as the main mineral component and can endow the drilling fluid with viscous shearing force and filtration and wall building properties. For example, the bentonite can be sodium bentonite and/or calcium bentonite, preferably sodium bentonite. In another embodiment, the content amount of the bentonite is 2-4 wt. %, more preferably 3-4 wt. %.

Wherein, the filtrate reducer has an effect of reducing filter loss in drilling fluid. For example, the filtrate reducer can be ammonium hydrolyzed polyacrylonitrile ($NH_4$—HPAN) or sodium hydrolyzed polyacrylonitrile, etc. In another embodiment, the content amount of the filtrate reducer is 0.5-1 wt %, such as 0.7 wt. %.

Wherein, the temperature-tolerant filtrate reducer has an effect of reducing filter loss in drilling fluid and is temperature tolerant. For example, the temperature-tolerant filtrate reducer can be one or more of sulfonated phenolic resin, sulfonated lignite, and sulfonated sodium tannin. In another embodiment, the content amount of the temperature-tolerant filtrate reducer is 0.2-0.7 wt %, such as 0.5 wt %.

Wherein, the well wall stabilizer has an effect of inhibiting the dispersion of clay shale and drill cuttings, as well as functions such as water loss reduction, flow pattern improvement, and lubrication improvement, etc. For example, the well wall stabilizer can be potassium polyacrylate or polyacrylamide, etc. In another embodiment, the content amount of the well wall stabilizer is 0.2-1.5 wt. %, such as 0.5 wt. %.

Wherein, the anti-collapse agent has an effect of maintaining well wall stability. For example, the anti-collapse agent can be potassium humate, sodium humate, or sodium nitrohumate, etc. In another embodiment, the content amount of the anti-collapse agent is 0.5-1 wt. %, such as 0.7 wt. %.

Wherein, the anti-foaming agent has an effect of removing foams in the drilling fluid. For example, the anti-foaming agent can be silicone oil, polyoxypropylene glycerol ether, etc. In another embodiment, the content amount of the anti-foaming agent is 0.7-2 wt. %, such as 1 wt. %.

Wherein, the tackifier can improve the viscous shearing force of the drilling fluid. For example, the tackifier can be sodium carboxymethyl cellulose. In another embodiment, the content amount of the tackifier is 1-1.5 wt. %.

Wherein, the lubricant has an effect of decreasing the interfacial tension, decreasing the friction coefficient of drilling fluid, and de-foaming and lubrication. For example, the lubricant can be sodium hexadecyl benzosulfonate. In another embodiment, the content amount of the tackifier is 0.3-0.4 wt. %.

The above additives can be commercially available products, or can be prepared with conventional methods in the art. They will not be further detailed hereunder.

In the drilling fluid according to the present subject matter, in another embodiment, the content amount of sodium carbonate is 0.2-0.5 wt. %. In another embodiment, the content amount of the alkali metal hydroxide is 0.1-0.3 wt. %, more preferably is 0.1-0.2 wt. % (as a component of the drilling fluid, the alkali metal hydroxide can improve the mud-making performance of the bentonite, and can be one or more of sodium hydroxide, potassium hydroxide, and lithium hydroxide, and preferably is potassium hydroxide).

In another embodiment of the present subject matter, a drilling fluid is provide, containing 2.5-3 wt. % of protecting agent composition, 3-4 wt. % of bentonite, 0.2-0.5 wt. % of sodium carbonate, 0.5-1 wt. % of ammonium hydrolyzed polyacrylonitrile ($NH_4$—HPAN), 0.2-0.7 wt % sulfonated phenolic resin, 0.2-0.7 wt. % of potassium polyacrylate, 0.5-1 wt. % of potassium humate, 0.1-0.3 wt. % of potassium hydroxide, and 0.7-2 wt. % of silicone oil.

The present subject matter further provides an application of the above-mentioned drilling fluid in the drilling in low/ultra-low permeability reservoirs.

When the drilling fluid is used in well drilling in low/ultra-low permeability reservoirs, it can form a better hydrophobic and oleophobic layer on the reservoir rock and can protect the reservoir more effectively. It can provide protection for low/ultra-low permeability reservoir with 100 mD or lower permeability, especially for extra-low-permeability reservoirs with permeability as low as 10 mD or lower.

Hereunder the present subject matter will be further detailed in some embodiments.

In the following examples, the weight-average molecular weight is measured with a gel permeation chromatograph (GPC) (GPC Model E2695 from Waters Company (a USA company)); the molecular weight distribution coefficient is the ratio of the weight-average molecular weight to the number-average molecular weight measured with the GPC.

Preparation Example 1

This example is provided to describe the wettability reversal agent and the preparation method of the wettability reversal agent in the present subject matter.

First, mix sodium dodecyl sulfate (SDS, 1.23 g), $NaHCO_3$ (1 g) and 170 mL distilled water by stirring at a high speed (440-460 r/min) for 30 min to obtain a mixed solution of emulsifier; then, add a monomer mixture of butyl acrylate (BA, 16 g, 0.125 mol), methyl methacrylate (MMA, 12 g, 0.12 mol), methacrylic acid (MAA, 2 g, 0.023 mol), 3 g of acrylamide (AM, 0.042 mol, dissolved in 20 mL distilled water first), styrene (ST, 1 g, 0.0096 mol), and ethyl trifluoroacrylate (10.3 g, 0.067 mol) in droplets into the mixed solution of emulsifier within 2 min, and shear the solution at 190 rpm shearing speed with a shear emulsifying mixer (Model JRJ300-1 from Nantong Clare Mixing Equipment Co., Ltd) into a homogeneous pre-emulsion; transfer the pre-emulsion into a reaction vessel, then feed nitrogen for shielding, after that heat the pre-emulsion (at 0.5° C./min heating rate) while stirring quickly (at 300 rpm stirring speed), when the temperature of the pre-emulsion arrives at 65° C., add ½ of APS (the total quantity is 0.21 g APS dissolved in 10 mL water) into the pre-emulsion while slowing down the stirring speed to 220 rpm; add the remaining APS when the temperature reaches 75° C., and then further heat up to 80° C. and hold at the temperature for 3 h; next, when the temperature drops to 60° C. or lower naturally, add $NaHCO_3$ to adjust the pH to a neutral value, then, cool down to 50° C. or lower, stop stirring, and treat the emulsion by evaporation at a constant temperature of 30° C., and finally obtain 45 g solid, which is the wettability reversal agent A1 described in the present subject matter. The weight-average molecular weight is 5,829 g/mol, and the molecular weight distribution coefficient is 1.2; analyzed by H-NMR spectroscopy and C-NMR spectroscopy, the polymer contains structural units denoted by formula (1), (2), (3), (4), (5) and (6) at 1:0.96:0.18:0.34: 0.077:0.54 molar ratio.

Preparation Example 2

This example is provided to describe the wettability reversal agent and the preparation method of the wettability reversal agent in the present subject matter.

First, mix sodium dodecyl sulfate (SDS, 2.1 g), $NaHCO_3$ (2 g) and 200 mL distilled water by stirring at a high speed (440-460 r/min) for 40 min to obtain a mixed solution of emulsifier; then, add a monomer mixture of butyl acrylate (BA, 20 g, 0.156 mol), methyl methacrylate (MMA, 15 g, 0.15 mol), methacrylic acid (MAA, 4 g, 0.047 mol), 5 g of acrylamide (AM, 0.058 mol, dissolved in 20 mL distilled water first), p-methyl styrene (ST, 2.2 g, 0.019 mol), and ethyl trifluoroacrylate (10.3 g, 0.067 mol) in droplets into the mixed solution of emulsifier within 5 min, and shear the solution at 190 rpm shearing speed with a shear emulsifying mixer (Model JRJ300-1 from Nantong Clare Mixing Equipment Co., Ltd) into a homogeneous pre-emulsion; transfer the pre-emulsion into a reaction vessel, then feed nitrogen for shielding, after that heat the pre-emulsion (at 2° C./min heating rate) while stirring quickly (at 400 rpm stirring speed), when the temperature of the pre-emulsion arrives at 70° C., add ½ of APS (the total quantity is 0.25 g APS dissolved in 10 mL water) into the pre-emulsion while slowing down the stirring speed to 250 rpm; add the remaining APS when the temperature reaches 80° C., and then further heat up to 85° C. and hold at the temperature for 2.5 h; next, when the temperature drops to 60° C. or lower naturally, add $NaHCO_3$ to adjust the pH to a neutral value, then, cool down to 50° C. or lower, stop stirring, and treat the emulsion by evaporation at constant temperature of 30° C., and finally obtain 60 g solid, which is the wettability reversal agent A2 described in the present subject matter. The weight-average molecular weight is 5,423 g/mol, and the molecular weight distribution coefficient is 1.4; analyzed by H-NMR spectroscopy and C-NMR spectroscopy, the polymer contains structural units denoted by formula (1), (2), (3), (4), (5) and (6) at 1:0.96:0.3:0.37:0.12: 0.43 molar ratio.

Preparation Example 3

This example is provided to describe the wettability reversal agent and the preparation method of the wettability reversal agent in the present subject matter.

First, mix sodium dodecyl sulfate (SDS, 2.5 g), $NaHCO_3$ (1.5 g) and 200 mL distilled water by stirring at a high speed (440-460 r/min) for 25 min to obtain a mixed solution of emulsifier; then, add a monomer mixture of butyl acrylate (BA, 32 g, 0.25 mol), methyl methacrylate (MMA, 25 g, 0.25 mol), methacrylic acid (MAA, 2 g, 0.023 mol), 6 g of acrylamide (AM, 0.084 mol, dissolved in 20 mL distilled water first), styrene (ST, 3.1 g, 0.03 mol), and ethyl trifluoroacrylate (20.6 g, 0.134 mol) in droplets into the mixed solution of emulsifier within 3 min, and shear the solution at 190 rpm shearing speed with a shear emulsifying mixer (Model JRJ300-1 from Nantong Clare Mixing Equipment Co., Ltd) into a homogeneous pre-emulsion; transfer the pre-emulsion into a reaction vessel, then feed nitrogen for shielding, after that heat the pre-emulsion (at 1° C./min heating rate) while stirring quickly (at 350 rpm stirring speed), when the temperature of the pre-emulsion arrives at 60° C., add ½ of APS (the total quantity is 0.3 g APS dissolved in 10 mL water) into the pre-emulsion while slowing down the stirring speed to 200 rpm; add the remaining APS when the temperature reaches 65° C., and then further heat up to 75° C. and hold at the temperature for 4 h; next, when the temperature drops to 60° C. or lower naturally, add $NaHCO_3$ to adjust the pH to a neutral value, then, cool down to 50° C. or lower, stop stirring, and treat the emulsion by evaporation at a constant temperature of 30° C., and finally obtain 50 g solid, which is the wettability reversal agent A3 described in the present subject matter. The weight-average molecular weight is 5,916 g/mol, and the molecular weight distribution coefficient is 1.3; analyzed by H-NMR spectroscopy and C-NMR spectroscopy, the polymer contains structural units denoted by formula (1), (2), (3), (4), (5) and (6) at 1:1:0.092:0.34:0.24:0.54 molar ratio.

Comparative Preparation Example 1

According to the preparation method described in example 1, but the difference is that the concentrations of the monomers are: butyl acrylate (BA, 25.6 g, 0.2 mol), methyl methacrylate (MMA, 30 g, 0.3 mol), methacrylic acid (MAA, 17.2 g, 0.2 mol), 7.1 g of acrylamide (AM, 0.1 mol, dissolved in 20 mL distilled water first), styrene (ST, 10.4 g, 0.1 mol), and ethyl trifluoroacrylate (15.4 g, 0.1 mol); the total concentration of the initiator APS is 0.3 g dissolved in 10 mL water; heat up to 55° C. and hold at the temperature for 3 h; finally, 106.5 g polymer D1 is obtained. The weight-average molecular weight is 4,591 g/mol, and the molecular weight distribution coefficient is 1.2; analyzed by H-NMR spectroscopy and C-NMR spectroscopy, the polymer contains structural units denoted by formula (1), (2), (3), (4), (5) and (6) at 1:1.5:1:0.5:0.5:0.5 molar ratio.

Comparative Preparation Example 2

According to the preparation method described in example 1, but the difference is that the concentrations of the monomers are: butyl acrylate (BA, 12.8 g, 0.1 mol), methyl methacrylate (MMA, 25 g, 0.25 mol), methacrylic acid (MAA, 25.8 g, 0.3 mol), 14.2 g of acrylamide (AM, 0.2 mol, dissolved in 20 mL distilled water first), styrene (ST, 10.4 g, 0.1 mol), and ethyl trifluoroacrylate (30.8 g, 0.2 mol); the total concentration of the initiator APS is 1 g dissolved in 10 mL water; heat up to 95° C. and hold at the temperature for 4.5 h; finally, 120 g polymer D2 is obtained. The weight-average molecular weight is 7,516 g/mol, and the molecular weight distribution coefficient is 1.3; analyzed by H-NMR spectroscopy and C-NMR spectroscopy, the polymer contains structural units denoted by formula (1), (2), (3), (4), (5) and (6) at 1:2.5:3:2:1:2 molar ratio.

Preparing Example 1

Add styrene (31.2 g, 0.3 mol), butyl acrylate (25.6 g, 0.2 mol) and 2-acrylamide-2-methyl propanesulfonic acid (31 g, 0.15 mol) into 100 mL water to form a primary mixture, add 3 g sodium dodecyl benzene sulfonate (from Jinan Huifengda Chemicals Co., Ltd., China, the same below) to obtain an emulsified mixture, feed nitrogen into the emulsified mixture for 30 min, heat up the emulsified mixture to 65° C. and add 0.3 g ammonium persulfate into it, and then further heat up the emulsified mixture to 70° C. and hold it at the temperature for 4 h; after the reaction is completed, cool down the reaction solution to 40° C., add 20 wt. % of water solution of sodium hydroxide to adjust the pH to 9, and then add 5 mL methanol and stir to obtain a precipitate; dry the obtained precipitate at 100° C. and grind it into powder; thus, 77 g solid protecting agent B1 (yellowish powder) is obtained, which is the protecting agent described in the present subject matter. The weight-average molecular weight of the protecting agent is 55,346 g/mol, and the molecular weight distribution coefficient is 1.3; analyzed by H-NMR spectroscopy and C-NMR spectroscopy, the polymer contains structural units denoted by formula (7), structural units denoted by formula (8), and structural units denoted by formula (9) at 1:0.67:0.5 molar ratio.

Preparing Example 2

According to the preparation method described in preparing example 1, but the concentrations of the monomers are: styrene (20.8 g, 0.19 mol), butyl acrylate (38.4 g, 0.3 mol) and 2-acrylamide-2-methyl propanesulfonic acid (15.5 g, 0.07 mol); the concentration of the emulsifier is 2 g sodium dodecyl benzene sulfonate, the concentration of ammonium persulfate is 0.2 g; thus, 65.5 g solid protecting agent B2 (yellowish powder) is obtained, which is the protecting agent described in the present subject matter. The weight-average molecular weight of the protecting agent is 58,472 g/mol, and the molecular weight distribution coefficient is 1.2; analyzed by H-NMR spectroscopy and C-NMR spectroscopy, the polymer contains structural units denoted by formula (7), structural units denoted by formula (8), and structural units denoted by formula (9) at 1:1.6:0.37 molar ratio.

Examples 1-3

These examples are provided here to describe the protecting agent composition and drilling fluid according to the present subject matter. Prepare drilling fluids Y1-Y3 with the following formulation: 3 wt. % of protecting agent composition (see Table 1 for the composition), 4 wt. % of sodium bentonite (from Jinan Huifengda Chemicals Co., Ltd., China), 0.3 wt. % of sodium carbonate, 0.7 wt. % of ammonium hydrolyzed polyacrylonitrile ($NH_4$—HPAN, from Jinan Huifengda Chemicals Co., Ltd., China), 0.5 wt. % of sulfonated phenolic resin (from Jinan Huifengda Chemicals Co., Ltd., China), 0.5 wt. % of potassium polyacrylate (from Jinan Huifengda Chemicals Co., Ltd., China), 0.7 wt. % of potassium humate (from Jinan Huifengda Chemicals Co., Ltd., China), 0.1 wt. % of potassium hydroxide, 1 wt. % of silicone oil (from Jinan Huifengda Chemicals Co., Ltd., China), and water (remaining content amount).

Example 4

This example is provided here to describe the protecting agent composition and drilling fluid according to the present subject matter. Prepare drilling fluid Y4 with the following formulation: 2.5 wt. % of protecting agent composition (see Table 1 for the composition), 3 wt. % of sodium bentonite (from Jinan Huifengda Chemicals Co., Ltd., China), 0.5 wt. % of sodium carbonate, 1.1 wt. % of sodium carboxymethyl cellulose (from Jinan Huifengda Chemicals Co., Ltd., China), 0.8 wt. % of sodium nitrohumate (from Jinan Huifengda Chemicals Co., Ltd., China), 0.6 wt. % of acrylamide (from Jinan Huifengda Chemicals Co., Ltd., China), 0.3 wt. % of sodium hexadecyl benzosulfonate (from Jinan Jinrihe Chemicals Co., Ltd., China), 0.8 wt. % of potassium polyacrylate (from Jinan Huifengda Chemicals Co., Ltd., China), and water (remaining content amount).

Comparative Example 1

According to the method described in example 1, but without adding protecting agent composition, to obtain a drilling fluid DY1.

Comparative Example 2

According to the method described in example 1, but the protecting agent composition does not contain a wettability reversal agent (see Table 1 for the composition), to obtain a drilling fluid DY2.

Comparative Example 3

According to the method described in example 1, but the protecting agent composition does not contain a protecting agent (see Table 1 for the composition), to obtain a drilling fluid DY3.

Comparative Example 4

According to the method described in example 1, but the composition of the protecting agent composition is that shown in Table 1, to obtain a drilling fluid DY4.

Comparative Example 5

According to the method described in example 1, but the composition of the protecting agent composition is that shown in Table 1, to obtain a drilling fluid DY5.

TABLE 1

| Example | Wettability Reversal Agent | Protecting agent | Weight Ratio of Wettability Reversal Agent to Protecting agent |
|---|---|---|---|
| Example 1 | A1 | B1 | 1:1 |
| Example 2 | A2 | B2 | 1:2 |
| Example 3 | A3 | B1 | 1:3 |
| Example 4 | A1 | B1 | 1:3 |
| Comparative example 1 | / | / | / |
| Comparative example 2 | / | B1 | 0:1 |
| Comparative example 3 | A1 | / | 1:0 |
| Comparative example 4 | D1 | B1 | The same as example 1 |
| Comparative example 5 | D2 | B1 | The same as example 1 |

Test Example 1

Rheology property test: take 400 mL the above drilling fluids Y1-Y4 and DY1-DY5 respectively, stir for 5 min at a low speed, and then measure the apparent viscosity (AV, mPa·s), plastic viscosity (PV, mPa·s), dynamic shearing force (YP, Pa), 10 s and 10 min static shearing force, and API water loss under moderate pressure (API, FL, mL) of the drilling fluids respectively as per GB/T16783.1-2006. The results are shown in Table 2.

TABLE 2

| Drilling Fluid | AV (mPa·s) | PV (mPa·s) | YP (Pa) | 10 s/10 min (Pa/Pa) | API.FL (mL) |
|---|---|---|---|---|---|
| Y1 | 65 | 33 | 41 | 5.0/8.0 | 0.3 |
| Y2 | 69 | 31 | 39 | 5.5/7.5 | 0.4 |
| Y3 | 59 | 32 | 37 | 5.0/7.5 | 0.2 |
| Y4 | 63 | 34 | 38 | 4.5/6.5 | 0.3 |
| DY1 | 61 | 32 | 36 | 4.5/7.0 | 2.1 |
| DY2 | 58 | 33 | 38 | 4.5/6.5 | 1.1 |
| DY3 | 65 | 32 | 39 | 5.0/7.0 | 1.6 |
| DY4 | 67 | 31 | 34 | 5.5/7.5 | 0.8 |
| DY5 | 71 | 34 | 43 | 6.0/7.0 | 0.9 |

It can been seen in Table 2: when the wettability reversal agent and protecting agent composition according to the present subject matter are used in combination in the drilling fluid, the API filter loss can be reduced to 0.2-0.4 mL. When neither the wettability reversal agent nor the protecting agent is used, the filter loss is maximum, as high as 2.1 mL; when the wettability reversal agent A1 or protecting agent B1 is used merely, the filter loss is 1.6 mL or 1.1 mL, which is relatively high. When the wettability reversal agent D1 or D2 is used with the protecting agent B1 in combination, the filter loss is 0.8 mL or 0.9 mL. An optimal reservoir protection effect can be obtained when A3 and B1 are used in combination.

Test Example 2

Temperature tolerance test: take 400 mL above drilling fluids Y1-Y4 and DY1-DY5 respectively, stir for 20 min at a high speed, load the drilling fluids into aging cans and then load the aging cans into a roller furnace and roll for 16 h at 150° C. temperature; then, take out the aging cans and cool down them to room temperature (about 20° C.), stir for 5 min at a high speed, and then measure the apparent viscosity (AV, mPa·s), plastic viscosity (PV, mPa·s), dynamic shearing force (YP, Pa), 10 s and 10 min. static shearing force, API water loss under moderate pressure (API, FL, mL), and water loss under high temperature and high pressure (HTHP, FL, mL) of the drilling fluids respectively as per GB/T16783.1-2006. The results are shown in Table 3.

TABLE 3

| Drilling Fluid | AV (mPa·s) | PV (mPa·s) | YP (Pa) | 10 s/10 min (Pa/Pa) | API.FL (mL) | HTHP.FL (mL) |
|---|---|---|---|---|---|---|
| Y1 | 64 | 33 | 37 | 5.5/7.5 | 0.3 | 1.3 |
| Y2 | 63 | 31 | 39 | 6.5/8 | 0.3 | 1.4 |
| Y3 | 61 | 35 | 37 | 5.5/7.5 | 0.2 | 0.5 |
| Y4 | 59 | 29 | 35 | 6/8 | 0.3 | 0.8 |
| DY1 | 61 | 32 | 32 | 3.5/5.5 | 1.3 | 5.2 |
| DY2 | 53 | 31 | 29 | 4/6.5 | 1.3 | 3.2 |
| DY3 | 57 | 35 | 28 | 4.5/7 | 1.2 | 3.1 |
| DY4 | 62 | 36 | 33 | 5.5/6.5 | 0.9 | 2.2 |
| DY5 | 59 | 32 | 35 | 6/7 | 0.8 | 2.1 |

It can been seen in Table 3: when the wettability reversal agent and protecting agent composition according to the present subject matter are used in combination in the drilling fluid, the API filter loss can be reduced to 0.2-0.3 mL, and the HTHP filter loss can be reduced to 0.5-1.4 mL. When neither the wettability reversal agent nor the protecting agent is used, the API filter loss is maximum, as high as 1.3 mL, and the HTHP filter loss is 5.2 mL; when the wettability reversal agent A1 or protecting agent B2 is used merely, the API filter loss is 1.3 mL or 1.2 mL, which is relatively high, and the HTHP filter loss is 3.2 mL or 3.1 mL. When the wettability reversal agent D1 or D2 is used with the protecting agent B1 in combination, the API filter loss is 0.9 ml or 0.8 ml, and the HTHP filter loss is 2.2 mL or 2.1 mL. An optimal reservoir protection effect can be obtained when A3 and B1 are used in combination.

Test Example 3

Assessment of recovery rate of clay shale: add 350 mL above drilling fluids Y1-Y4 and DY1-DY5 and 50 g dry drill cuttings (6-10 mesh drill cuttings dried at 150° C.) into aging cans respectively, and carry out aging at 120° C. for 16 h; filter the mixtures after aging through a 40 mesh sieve and flush with tap water respectively; dry the drill cuttings after flushing at 105° C., weigh, and calculate the recovery rate of clay shale=weight of dried drill cuttings/initial weight of drill cuttings×100%.

Assessment of linear expansion of clay shale: take rock powder obtained through drying and grinding, and prepare the rock powder into core blocks (press for 5 min at 4 MPa pressure) for assessment; start a M4600 linear expansion tester for clay shale, mount the core blocks in the tester, make zero adjustment, and then pour the drilling fluids Y1-Y4 and DY1-DY5 respectively; start the test, and record the linear expansion (mm) once every 0.5 h; compare with a reference solution (distilled water), and calculate the linear expansion reduction rate=(measured height−initial height)/initial height×100%.

TABLE 4

| Drilling Fluid | Rolling Recovery Rate of Clay Shale (%) | Linear Expansion Reduction Rate of Clay Shale (%) | | | |
|---|---|---|---|---|---|
| | | 2 h | 4 h | 6 h | 8 h |
| Y1 | 91.1 | 88.3 | 85.1 | 82.9 | 80.7 |
| Y2 | 92.1 | 89.2 | 85.5 | 82.7 | 80.1 |
| Y3 | 90.3 | 87.3 | 85.1 | 82.9 | 81.2 |
| Y4 | 91.3 | 87.7 | 84.7 | 82.1 | 81.1 |
| DY1 | 86.1 | 84.3 | 83.2 | 81.9 | 78.3 |
| DY2 | 84.1 | 82.2 | 80.1 | 78.2 | 76.5 |
| DY3 | 87.1 | 85.1 | 83.4 | 82.1 | 80.1 |
| DY4 | 88.6 | 86.2 | 84.1 | 82.7 | 79.1 |
| DY5 | 89.1 | 86.1 | 84.2 | 82.1 | 79.5 |

It can be seen in Table 4: the wettability reversal agent can inhibit the hydrated expansion of clay shale to some degree, can improve the rolling recovery rate and linear expansion reduction rate (up to 90% or above) of the clay shale. Hence, the wettability reversal agent has good inhibition performance, and can meet the requirement of well drilling.

Test Example 4

Measurement of wetting property of rock surface: take 400 mL above drilling fluid Y1-Y4 and DY1-DY5 respectively, and immerse rock cores in a filtrate for 8 h at 160° C.; then, take out the rock cores, cool down and dry them naturally, and measure the wetting angles of distilled water, oil field waste water, hexadecane, and crude oil on the rock surface with a JGW-360A contact angle meter, respectively.

TABLE 5

| Drilling Fluid | Distilled water/° | Oil field waste water/° | Hexadecane/° | Crude oil/° |
|---|---|---|---|---|
| Y1 | 120.6 | 113.7 | 91.1 | 108.3 |
| Y2 | 115.5 | 102.3 | 89.5 | 106.4 |
| Y3 | 111.9 | 101.9 | 88.4 | 105.6 |
| Y4 | 119.4 | 105.6 | 87.6 | 106.4 |
| DY1 | 13.41 | 9.67 | 16.8 | 21.3 |
| DY2 | 19.2 | 11.3 | 17.2 | 23.4 |
| DY3 | 105.9 | 99.8 | 84.6 | 96.4 |
| DY4 | 109.4 | 98.5 | 85.1 | 97.5 |
| DY5 | 113.2 | 96.4 | 86.7 | 96.1 |

It can be seen in Table 5: when the wettability reversal agent and the protecting agent composition according to the present subject matter are used in combination in a drilling fluid, the wettability reversal agent can take a good wettability reversal effect. For example, the contact angle of distilled water on the surface of rock core is increased to 110° or above, preferably is 110-125°; the contact angle of oil field waste water on the surface of rock core is increased to 100° or above, preferably is 100-115°; the contact angle of hexadecane on the surface of rock core is increased to 85° or above, preferably is 87-95°; the contact angle of crude oil on the surface of rock core is increased to 100° or above, preferably is 100-110°. Hence, the requirement for wettability reversal can be met.

Test Example 5

Test the reservoir protection performance of the above drilling fluids Y1-Y4 and DY1-DY5 in a JHMD-1 HTHP dynamic filter loss tester as per SYT6540-2002 "Method for Lab Assessment of Drilling and Completion Fluids Damaging Oil Formation". The results are shown in Table 6;

Wherein, the original permeability of the rock core used in the test is the initial value shown in Table 6.

TABLE 6

| Drilling Fluid | Rock Core No. | Permeability to Oil/$10^{-3}$ μm$^2$ | | Plugging Rate/% | Recovery Rate of Permeability/% | |
|---|---|---|---|---|---|---|
| | | Initial Value | After Plugging | | After Damage | After End Face Cutting |
| Y1 | 1 | 1.75 | 0.08 | 93.4 | 91.9 | 92.3 |
| Y2 | 2 | 2.13 | 0.083 | 93.1 | 92.1 | 93.6 |
| Y3 | 3 | 3.12 | 0.134 | 98.7 | 98.2 | 99.1 |
| Y4 | 4 | 1.75 | 0.049 | 92.2 | 88.3 | 91.1 |
| DY1 | 6 | 1.18 | 0.29 | 75.8 | 71.9 | 73.3 |
| DY2 | 7 | 4.23 | 0.233 | 89.5 | 86.1 | 78.1 |
| DY3 | 8 | 4.75 | 1.12 | 86.5 | 88.2 | 89.5 |
| DY4 | 9 | 5.18 | 0.35 | 89.3 | 89.1 | 87.9 |
| DY5 | 10 | 5.92 | 0.266 | 89.5 | 88.7 | 88.7 |

It is seen in Table 6: when the wettability reversal agent and the protecting agent composition according to the present subject matter are used in combination in a drilling fluid, a good reservoir plugging effect and high permeability recovery capability can be obtained. For example, the plugging rate can be 90% or above, and the permeability recovery rate can be 90% or above.

In summary, it is obvious that the protecting agent composition disclosed in the application has strong wettability reversal capability and strong plugging capability. Hence, when it is used in a drilling fluid, the damages in the drilling process in low/ultra-low permeability reservoirs can be reduced significantly.

While some preferred embodiments of the present invention are described above, the present invention is not limited to the details in those embodiments. Those skilled in the art can make modifications and variations to the technical scheme of the present invention, without departing from the spirit of the present invention. However, all these modifications and variations shall be deemed as falling into the protected domain of the present invention.

In addition, it should be noted that the specific technical features described in above embodiments can be combined in any appropriate form, provided that there is no conflict. To avoid unnecessary repetition, the possible combinations are not described specifically in the present invention.

Moreover, different embodiments of the present invention can be combined freely as required, as long as the combinations don't deviate from the ideal and spirit of the present invention. However, such combinations shall also be deemed as falling into the scope disclosed in the present invention.

What is claimed is:

1. A preparation method of a wettability reversal agent, comprising:
   (1) adding an emulsifier into water to prepare a mixed solution of emulsifier;
   (2) adding compounds represented by formula (1-a), (2-a), (3-a), (4-a), (5-a), and (6-a) to the mixed solution of emulsifier to obtain a pre-emulsion, adding an initiator, and initiating a polymerization reaction;

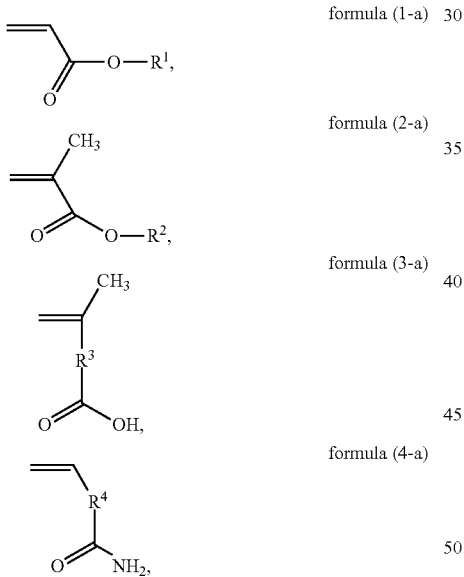

formula (1-a)

formula (2-a)

formula (3-a)

formula (4-a)

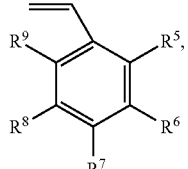

formula (5-a)

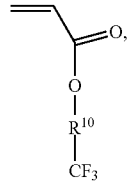

formula (6-a)

wherein, $R^1$ is $C_1$-$C_6$ alkyl; $R^2$ is $C_1$-$C_6$ alkyl; $R^3$ and $R^4$ independently are $C_0$-$C_6$ alkyl; $R^5$, $R^6$, $R^7$, $R^8$ and $R^9$ independently are $C_1$-$C_6$ alkyl or H; $R^{10}$ is $C_0$-$C_6$ alkyl;

a molar ratio among the compounds represented by formula (1-a), (2-a), (3-a), (4-a), (5-a), and (6-a) is 1:0.9-1.5:0.09-0.5:0.2-0.5:0.05-0.3:0.3-0.8; and conditions of the polymerization reaction ensures that weight-average molecular weight of the obtained wettability reversal agent is 5,000-7,000 g/mol;

wherein, a weight ratio of emulsifier to water in the mixed solution of emulsifier obtained in step (1) is 0.7-2:100.

2. The method according to claim 1 wherein the mixed solution of emulsifier further contains an alkali-metal carbonate and/or bicarbonate, and the weight ratio of the alkali-metal carbonate and/or bicarbonate to water is 0.5-1.5:100.

3. The method according to claim 1 wherein in step (2), based on the total weight of the compounds represented by formula (1-a), (2-a), (3-a), (4-a), (5-a), and (6-a), the concentration of the emulsifier is 2.5-4 wt. %.

4. The method according to claim 1 wherein based on the total weight of the compounds represented by formula (1-a), (2-a), (3-a), (4-a), (5-a), and (6-a), the concentration of the initiator is 0.3-0.6 wt. %.

5. The method according to claim 4 wherein the initiator is one or more of ammonium persulfate, hydrogen peroxide, and potassium persulfate.

6. The method according to claim 1 wherein the conditions of the polymerization reaction include: temperature is 75-85° C., time is 2.5-4 h.

* * * * *